(12) United States Patent
Hyde et al.

(10) Patent No.: US 7,972,557 B2
(45) Date of Patent: Jul. 5, 2011

(54) PLASMON FILTER

(75) Inventors: Roderick A. Hyde, Redmond, WA (US); Edward K. Y. Jung, Bellevue, WA (US); William Henry Mangione-Smith, Kirkland, WA (US); Nathan P. Myhrvold, Medina, WA (US); John Brian Pendry, Cobham (GB); Clarence T. Tegreene, Bellevue, WA (US); Charles Whitmer, North Bend, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 378 days.

(21) Appl. No.: 11/897,526

(22) Filed: Aug. 29, 2007

(65) Prior Publication Data
US 2009/0059402 A1 Mar. 5, 2009

(51) Int. Cl.
*C02F 1/30* (2006.01)
*A61L 9/18* (2006.01)
(52) U.S. Cl. ..... 422/22; 422/121; 422/186; 210/748.01; 96/224; 250/435
(58) Field of Classification Search .............. 422/22, 422/121, 186; 96/224; 210/748.01; 250/435
See application file for complete search history.

(56) References Cited

U.S. PATENT DOCUMENTS

| 7,295,723 | B2 | 11/2007 | Hyde | |
|---|---|---|---|---|
| 2004/0253624 | A1* | 12/2004 | Smith et al. | 435/6 |
| 2005/0155939 | A1* | 7/2005 | Stadelmann | 210/764 |
| 2005/0164169 | A1 | 7/2005 | Malak | |

FOREIGN PATENT DOCUMENTS
WO WO 2004/048936 A3 6/2004

OTHER PUBLICATIONS

Barnes, William L.; Dereux, Alain; Ebbesen, Thomas W.; "Surface Plasmon Subwavelength Optics"; Nature—Insight Review Articles; Aug. 14, 2003; pp. 824-830; vol. 424; Nature Publishing Group.
Homola, Jiří; Yee, Sinclair S.; and Gauglitz, Günter; "Surface Plasmon Resonance Sensors: Review," Sensors and Actuators B; bearing a date of 1999; pp. 3-15; vol. 54; Elsevier Science S.A.; 1999.
UK Intellectual Property Office Examination Report Under Section 18(3); App. No. GB0815581.4; Jun. 21, 2010; pp. 1-2.

* cited by examiner

*Primary Examiner* — Jill Warden

(57) ABSTRACT

A plasmon filter may include an element supportive of plasmon energy and having a plurality of openings through which a material may pass. A system includes a fluid filter supportive of evanescent energy, an evanescent field generator, a sensor, and/or other components. A corresponding method may include generating plasmons on the filter and exposing a material to the plasmon energy.

3 Claims, 16 Drawing Sheets

PLASMON FILTER

SUMMARY

In one embodiment, an apparatus comprises: a first element supportive of plasmon energy in a first energy range, the first element including a first plurality of openings; each of the openings in the first plurality of openings being configured to selectively pass a first portion of a first material; and each of the openings in the first plurality of openings having a respective characteristic dimension selected to provide substantial overlap of the passed first portion of the first material and the plasmon energy in the first energy range proximate the opening.

In another embodiment, a system comprises: a fluid filter supportive of evanescent energy and arranged to selectively pass a fluid; and an evanescent field generator arranged to produce the evanescent energy in a first frequency range within or proximate the fluid.

In another embodiment, a method comprises: filtering a fluid in a fluid flow region; generating a plasmon field in the fluid flow region; passing the fluid through the fluid flow region; and altering a property of the fluid via the plasmon field.

In another embodiment, a method comprises: providing a fluid to a fluid filter; creating plasmons on or adjacent to the filter; and altering the fluid via the plasmons.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
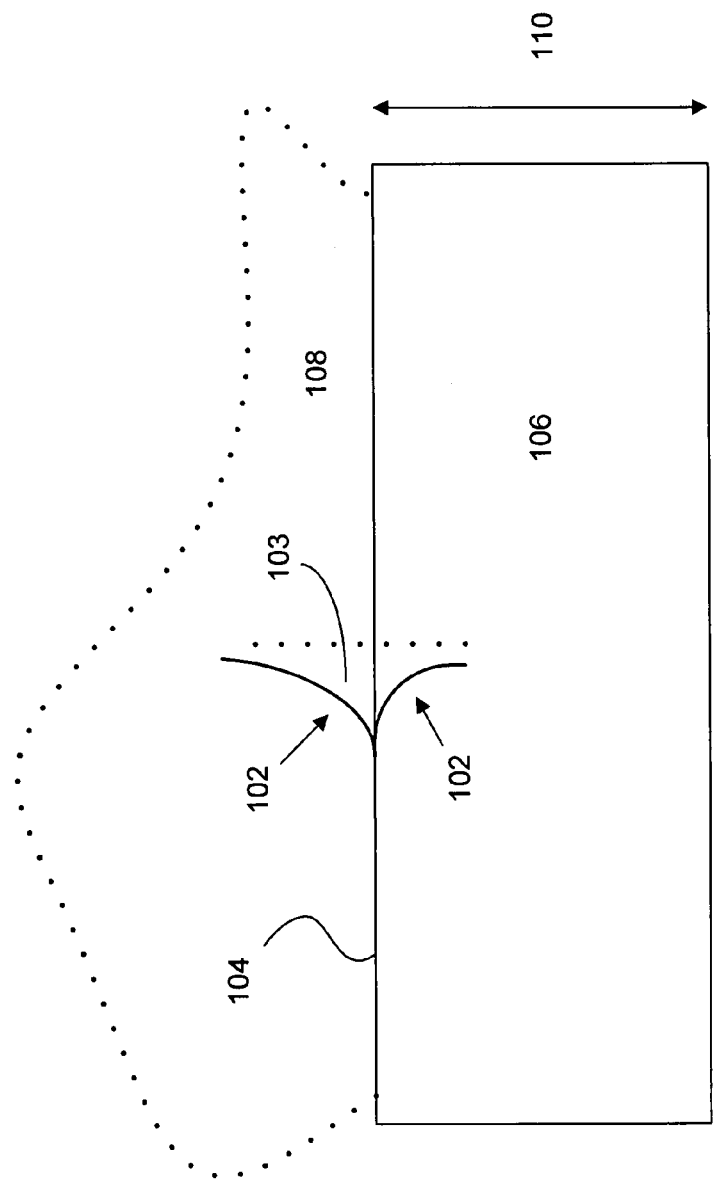
FIG. 1 is a schematic of a plasmon at a boundary.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Surface plasmons may exist on a boundary between two materials when the real parts of their dielectric constants $\epsilon$ and $\epsilon'$ have different signs, for example between a metal and a dielectric. FIG. 1 shows a plasmon 102 at a boundary 104 of a material 106 having a negative real dielectric constant, such as a metal. The material or structure 108 forming the boundary 104 with the material 106 may be: air, vacuum, or its equivalent; a substantially homogeneous dielectric material; or a different material or structure. The boundary 104, although shown as being substantially continuous and planar, may have a different shape. The plasmon 102, although shown as including substantially exponential functions with a field maximum at the boundary 104, may include only approximately exponential functions, may be described by a different function, and/or may have a field maximum someplace other than the boundary. Further, although the plasmon 102 is shown at a certain location on the boundary 104 for illustrative purposes, the spatial distribution of the plasmon 102 may be anything.

The plasmon 102 includes an evanescent field 103, where the evanescent field 103 is the portion of the plasmon 102 extending into the material or structure 108. However, an evanescent field may occur outside of a surface plasmon. For example, an evanescent field may occur at the boundary between two dielectrics where total internal reflection occurs.

Exposing material to evanescent energy may result in altered properties of the material, and evanescent energy may be capable of sterilization or other types of interaction with biomaterials or other materials that may not be biomaterials. Further, evanescent energy may be used to photocatalyze a chemical reaction, as described in PLASMON PHOTOCATALYSIS, U.S. Ser. No. 11/185,925, which is incorporated herein by reference.

As described further herein, evanescent energy may be utilized in a filter. For example, a material may pass through one or more apertures in which plasmons exist. In one approach, the function of the filter may depend on the type of reaction between the plasmon energy and the material that passes through the filter. Such a filter may be used, for example, in water purification, in purification of other consumables, as an air filter, or for other applications.

Figure 2:
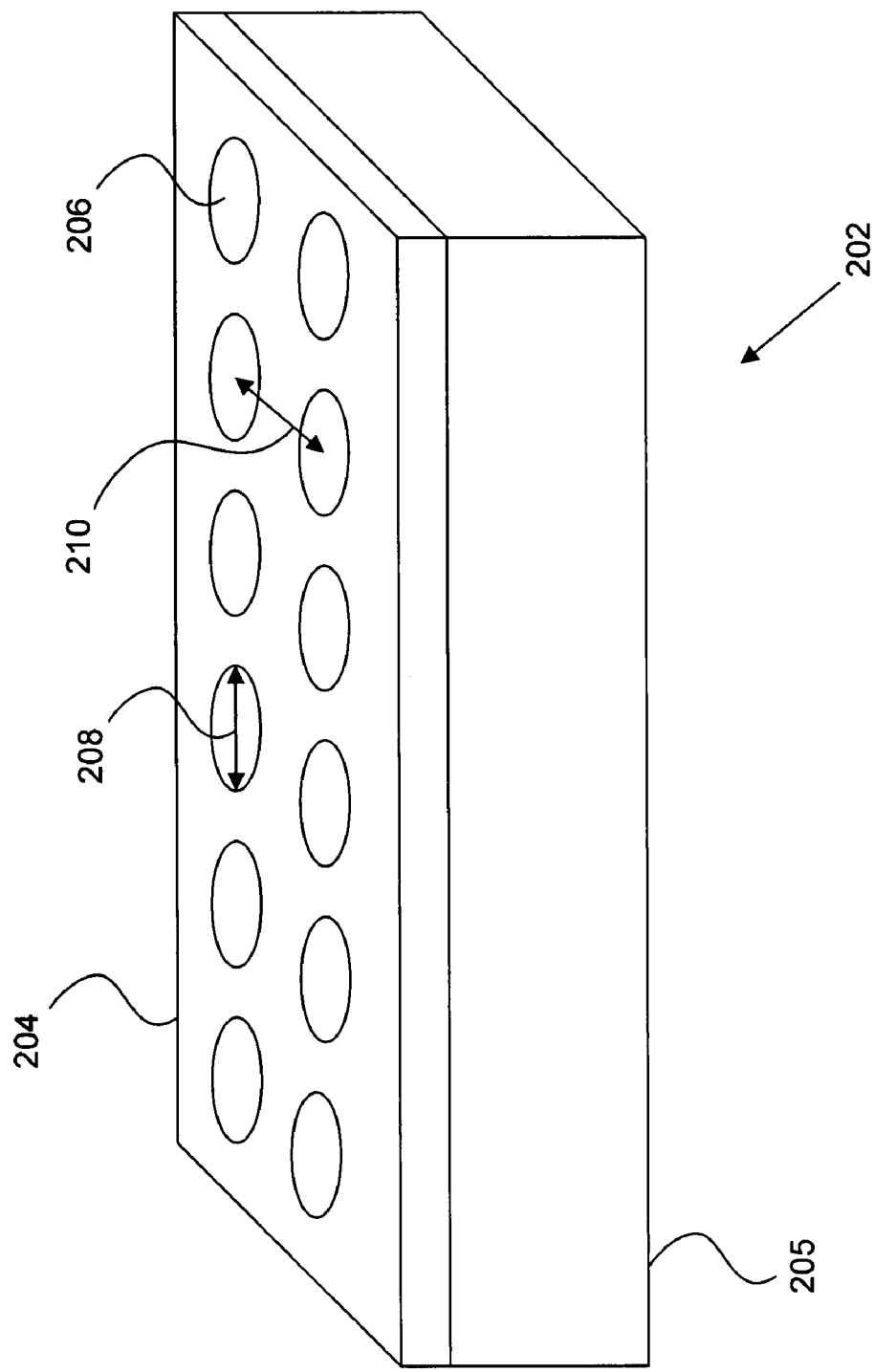
FIG. 2 is a schematic of a plasmon filter element.

A first embodiment of a plasmon filter element 202 is shown in FIG. 2. In this embodiment the filter element 202 includes a conductive layer 204 on a substrate 205 with an array of holes 206 through which a fluid may pass. The element 202 is configured to support plasmons 102, and the size 208 and spacings 210 of the holes 206 are configured such that the interior of the holes 206 support plasmon energy. Thus, a fluid passing through the holes 206 is exposed to the plasmon energy.

Although FIG. 2 shows the array of holes 206 as being a substantially regular array, in other embodiments the array may be an irregular array. Further, although the holes 206 are shown as being substantially the same size, in other embodiments the size 208 of the holes 206 may vary. The holes 206, although shown as being round, may be a different shape, including an irregular shape. For example, the openings may be distributed in a variety of fashions including relatively random distributions similar to the openings of a sponge or other porous material such as is found in some commercially available water filters. Accordingly, in some approaches a series of passageways, serpentine paths, or other physical structures may permit passage of fluid while selectively inhibiting passage of particles, in a similar fashion.

The conductive layer 204 shown in FIG. 2 may include gold, silver, and/or a different conductor. Although this conductive layer 204 is shown as being continuous and planar, in other embodiments the layer may have a different configuration. For example, the conductive layer 204 may include a grating patterned into it. Or, the conductive layer 204 may be patterned on just a portion of the substrate 205.

The substrate 205, also shown as being substantially continuous and planar, may also have a different shape. The substrate may include glass, plastic, and/or a different material. Further, some embodiments may not include a substrate 205, as in the case where the filter element 202 is made entirely of a conductor or where conductive material is distributed throughout the filter element 202, for example. The filter element may be a substantially three-dimensional element, or the filter element may be thin enough such that the thickness of the element is substantially less than the other dimensions of the element, such as an array of wires.

Although the embodiment of FIG. 2 has been described such that the volume of the holes 206 are supportive of plasmon energy, different embodiments may support different amounts of plasmon energy within the volume of the holes 206. For example, where the substrate 205 includes a layer of dielectric with a thin coating of a conductor 204, the concentration of the plasmon energy may be concentrated near the top of the hole 206, and there may be very little plasmon energy throughout the volume of the hole 206. Or, in another embodiment, the interior of the holes 206 may be coated with a conductor to increase the amount of plasmon energy in the hole 206.

Figure 3:
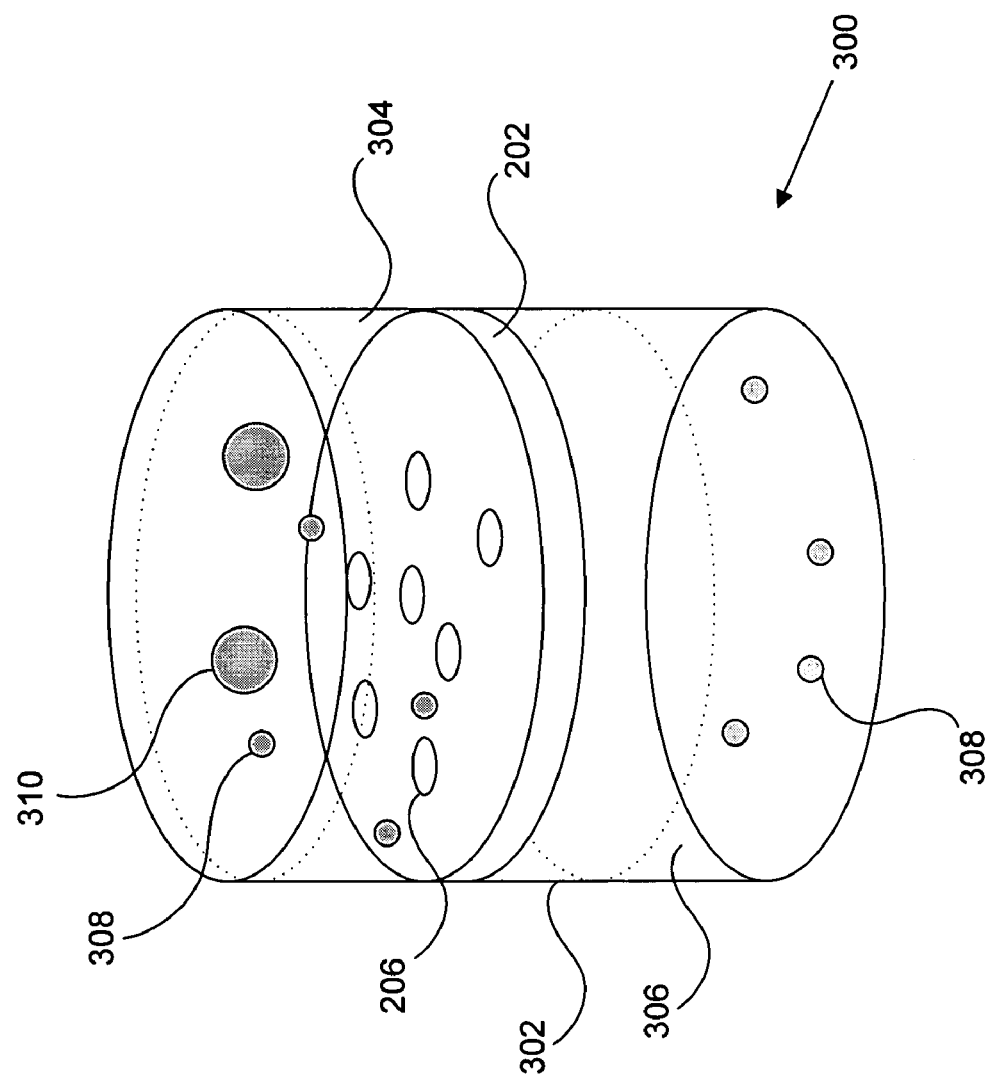
FIG. 3 is a schematic of a plasmon filter element in a housing.

An embodiment of an apparatus 300 having a filter element 202 supported by a housing 302 is shown in FIG. 3. The housing 302 is further configured to hold a material 304. In the illustrative embodiment shown in FIG. 3 the material 304 is a liquid that flows into the filter element 202. As shown, the portion of the material 304 that passes through the filter element 202 is the passed material 306 shown.

The material 304 includes a first and second set of particulates 308, 310, where the first set of particulates 308 have a first size and a second set of particulates 310 have a second size. The first set of particulates 308 are generally of a size and shape that will typically pass through the holes 206 of the filter element 202, and the second set of particulates 310 typically have one or more dimensions sufficiently large that the particulates 310 do not pass through the holes 206 or are significantly impeded from passing through the holes 206. Thus, the filter element 202 filters the material 304 by allowing a first portion of the material 304 (the portion that includes the first set of particulates 308) to pass through the filter element and by blocking a second portion of the material 304 (including the second set of particulates 310) from passing through the filter element, and it also filters the material 304 via the plasmon energy on the filter element.

The illustrated first and second set of particulates 308, 310 are an example of material that may be filtered by the filter element 202, and other embodiments may include particulates having different shapes than those shown, a set of particulates having many different sizes and/or shapes, or other deviations from the particulates 308, 310 shown in FIG. 3.

Although the material 304 to be filtered in FIG. 3 is a liquid, in other embodiments the material 304 to be filtered may be a gas or other type of material. The material 304 to be filtered may include (but is not limited to): water, air, a potable fluid, a dissolved substance, particulates, and/or a suspension. The material 304 to be filtered may include a biomaterial, which may include (but is not limited to): a vaccine, a pharmaceutical, nucleic acids, proteins, lipids, a blood component, or a different kind of biomaterial.

The housing 302, although shown as being supportive of the materials 304 and 306, in other embodiments may not be supportive of the material 304 to be filtered or the material 306 that has been filtered, and may only be supportive of the filter element 202 and/or other elements, or it may be supportive of only one of the materials 304 and 306.

Figure 4:
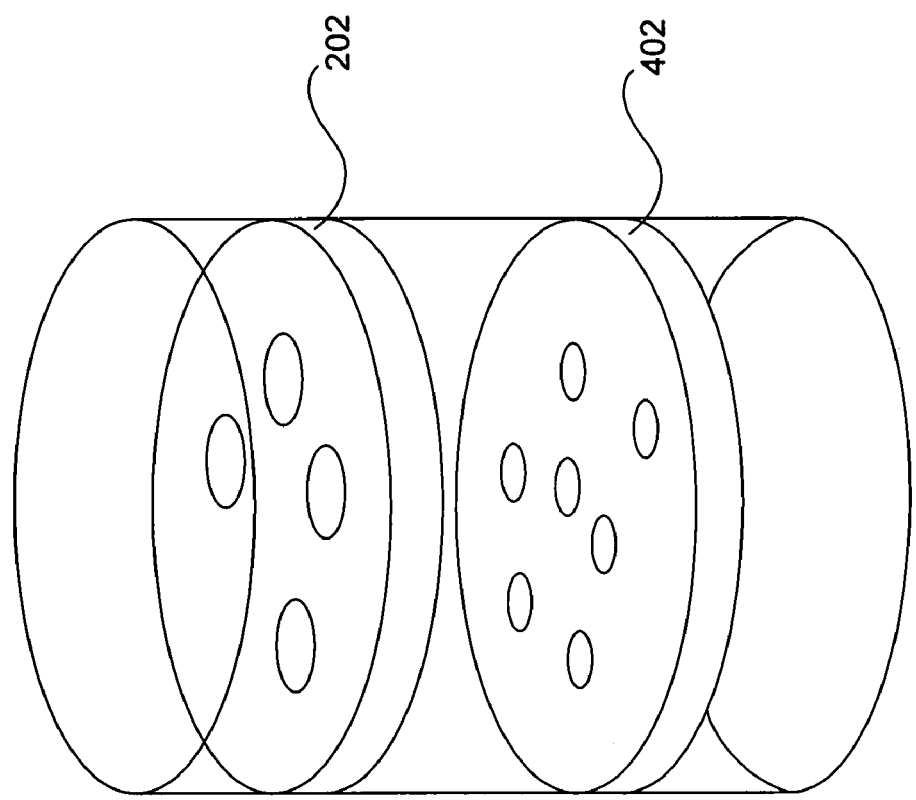
FIG. 4 is a schematic of an embodiment of two plasmon filter elements in a housing.

An embodiment of an apparatus 400 having two filter elements 202 and 402 supported by a housing 302 is shown in FIG. 4. In this embodiment the two elements 202, 402 are arranged in series such that a fluid passes through each of the elements. In this embodiment, the first filter element 202 has a first hole size 208 and spacing 210 and the second filter element 402 has a second hole size 408 and spacing 410. The filter elements 202, 402 may in some embodiments include different materials or other structural variations such that they support plasmons having different frequencies.

Although the apparatus 400 shown in FIG. 4 includes two elements 202 and 204, in other embodiments there may be more than two elements. The elements are shown having different hole sizes 208, 408 and spacings 210, 410, however in other configurations the differences between the elements 202, 402 may be different than what is shown, or the elements may be substantially the same. Further, although the elements 202, 402 are shown being substantially parallel, other embodiments may call for orientations where different filter elements such as elements 202, 402 are not parallel. Further, in some embodiments different filter elements such as elements 202, 402 may or may not be in close proximity. For example, where more than one filter element such as elements 202 and 402 are incorporated along the length of a pipe or a tube, the different elements 202, 402 may be separated by distances that correspond to a large fraction of the length of the pipe or tube, or by a small fraction of the length of the pipe or tube, depending on the application. In other embodiments, different filter elements such as 202 and 402 may simply be stacked together.

Figure 5:
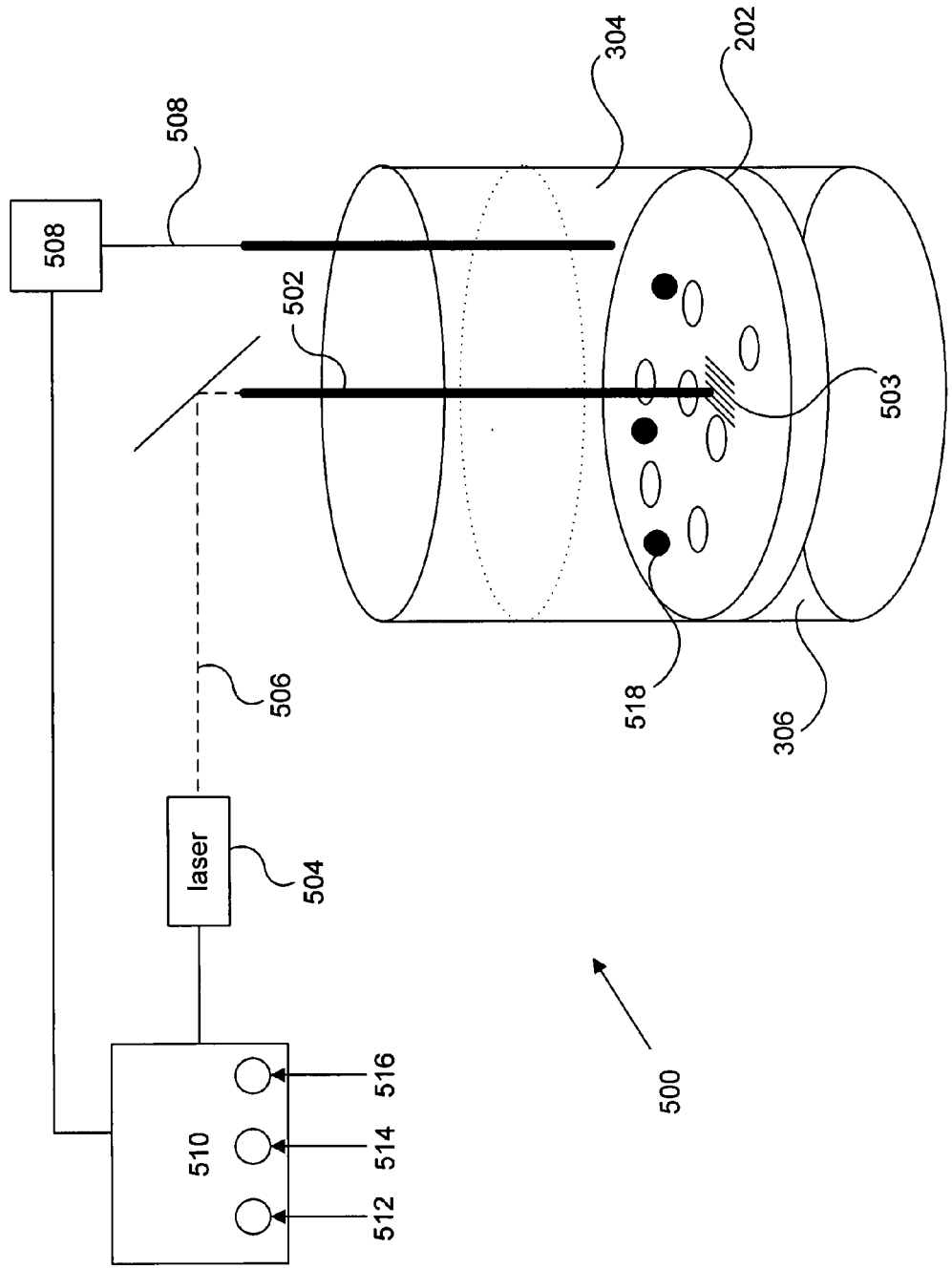
FIG. 5 is a schematic of an embodiment of a system including a plasmon filter element.

FIG. 5 shows an example of a system 500 including a filter element 202 in a housing 302. The system 500 includes an optical fiber 502 that carries electromagnetic energy, where the fiber 502 is in contact with the filter element 202 to excite plasmons on the filter element 202 via a plasmon generator 503, where in this case the plasmon generator 503 is a grating etched onto the filter element 202. The system further comprises a laser 504 arranged to provide electromagnetic energy 506 to the fiber 502. The system includes a laser 504 as one kind of source of electromagnetic energy, however other embodiments may include a different source such as an LED, ambient light, or a different source. The plasmon generator 503 is described as a grating, however other methods of coupling an electromagnetic wave to a plasmon are known to those skilled in the art, some of which are described in W. L. Barnes, A. Dereux, and T. W. Ebbesen, "Surface plasmon subwavelength optics", Nature, Volume 424, Aug. 14, 2003, 824-830, which is incorporated herein by reference.

The embodiment of FIG. 5 further shows the material 304 including a photocatalyst 518 such as titanium dioxide, where the photocatalyst 518 may be included in the material 304 to aid in sterilization or for other reasons. The photocatalyst 518 is shown in FIG. 5 as particles in the material 304, however the photocatalyst may be fabricated on the filter element 202, on the optical fiber 502, or may have some other configuration such that the photocatalyst 518 is receptive to plasmon energy. In one approach, the photocatalyst 518 may be released by the filter element 202 or another structure. The release may be a controlled release structure or through elution of the photocatalyst 518.

The embodiment of FIG. 5 further includes a surface plasmon resonance sensor 508, wherein the surface plasmon resonance sensor 508 is configured to measure one or more properties of the material 304. Surface plasmon resonance sensors are known to those skilled in the art for measuring properties of materials, for example, indices of refraction, and thereby measuring other quantities such as reaction rates, as described in J. Homola, S. S. Yee, and G. Gauglitz, "SURFACE PLASMON RESONANCE SENSORS: REVIEW", Sensors and Actuators B, Volume 54, 1999, 3-15, which is incorporated herein by reference. Although for clarity the surface plasmon resonance sensor 508 is shown as being separate from the fiber 502 and the laser 504, in other embodiments the fiber 502 and the laser 504 may be incorporated into the surface plasmon resonance sensor 508 such that they supply energy to the filter element 202 to generate plasmons both for filtering and for sensing. The surface plasmon resonance sensor 508 is shown in the material 304, but in other embodiments the surface plasmon resonance sensor 508 may be arranged to measure properties of the filtered material 306. Further, although FIG. 5 includes a surface plasmon resonance sensor 508, other embodiments may include other types of sensors, for example, apparatus configured to measure the conductivity of the materials 304, 306, or another kind of sensor.

A controller 510 is operably connected to the laser 504, where the controller includes inputs 512, 514, 516 are configured to adjust the frequency, amplitude, and pulse duration of the laser 504. The controller is further configured to receive a signal from the surface plasmon resonance sensor 508, and the output to the laser 504 may be a function of the signal received from the surface plasmon resonance sensor 508. Although the inputs 512, 514, 516 are described as frequency, amplitude, and pulse duration controls, other embodiments may control other parameters, and/or there may be more or fewer than three controls. The inputs 512, 514, 516 are shown as knobs to be controlled by a user, but in other embodiments the controls 512, 514, 516 may be adjusted by a signal such as an electronic signal, or via some other controller. Although the controller 510 is shown as receiving a signal from the surface plasmon resonance sensor 508 and sending a signal to the laser 540, in other embodiments the controller 510 may send and receive signals to and from other devices.

Figure 6:
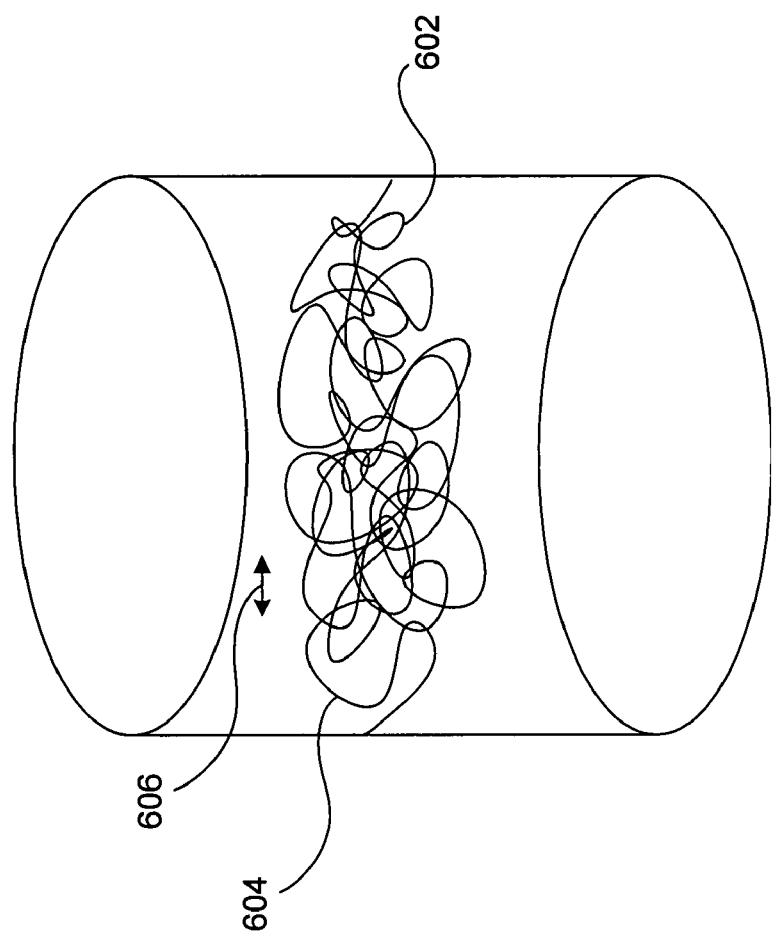
FIG. 6 is a schematic of a plasmon filter element having a mesh structure.

FIG. 6 shows an embodiment of an apparatus having a filter element with a mesh structure 602, where the filter element includes plasmon-supportive fiber 604 in a substantially random arrangement as shown. The plasmon-supportive fiber 604 may include a conductive wire, a wire coated with conductor, an optical fiber with a conductive outer layer, or another type of plasmon-supportive fiber. The filter element 602 may have an average density of plasmon-supportive fiber 604, where a high density of plasmon-supportive fiber 604 may correspond to a low average opening size 606 and a low density of plasmon-supportive fiber 604 may correspond to a high average opening size 606.

The mesh structure 602 is shown as a substantially irregular arrangement. However, in other embodiments it may have a substantially regular arrangement. For example, plasmon-supportive fibers 604 may be arranged to form a 2-d grid structure, an array of parallel fibers, or a different mesh structure 602 that is substantially two-dimensional. Or, plasmon-supportive fibers 604 may be arranged to form a substantially three-dimensional mesh structure 602.

Figure 7:
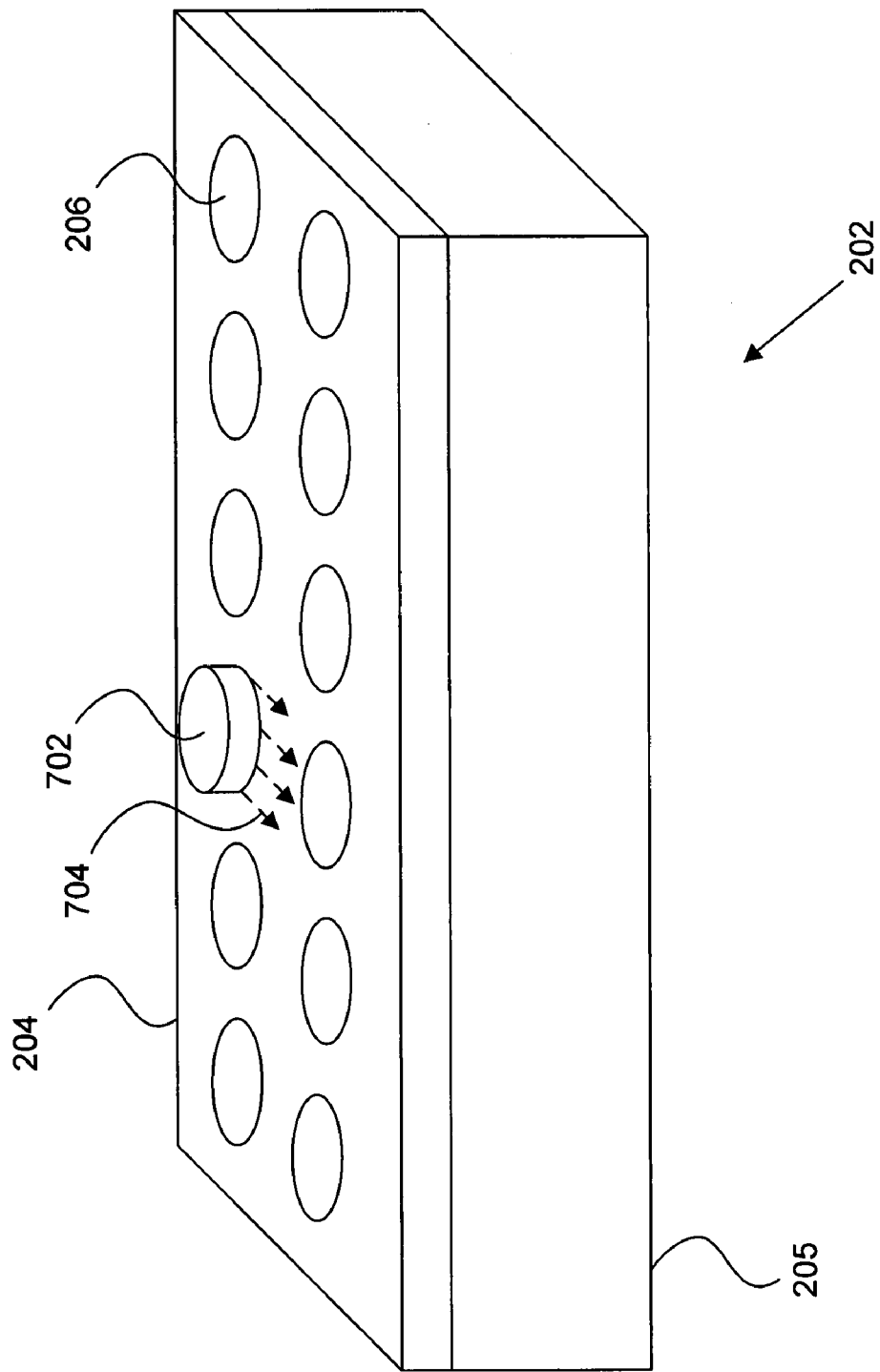
FIG. 7 is a schematic of a plasmon filter including a MEMS.

FIG. 7 shows an embodiment of a filter element 202 similar to that shown in FIG. 2 and including a cap 702 on one of the holes 206, where the cap is controlled by a microelectromechanical system (MEMS). The cap 702 is configured to slide away from the hole 206 in the direction of the arrows 704 to expose the hole 206 and allow fluid to pass through the hole 206, or to cover the hole 206 to prevent fluid from flowing through it.

Although FIG. 7 is shown with just one of the holes 206 controlled by a MEMS, in other embodiments more than one hole may 206 may be controlled by a MEMS. For example, in one embodiment all of the holes 206 in an array of holes 206 may be controlled by a MEMS device, allowing a user to selectively control the flow through the filter element 202 and/or determine which portion of the filter element 202 through which the fluid may flow. The one or more MEMS devices may be operably connected to a controller such as the controller 510 shown in FIG. 5.

Moreover, while the illustrative example shows a sliding cap 702, a variety of other MEMS structures, such as microvalves, or other control structures may control entry of or exit from the holes 206.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8:
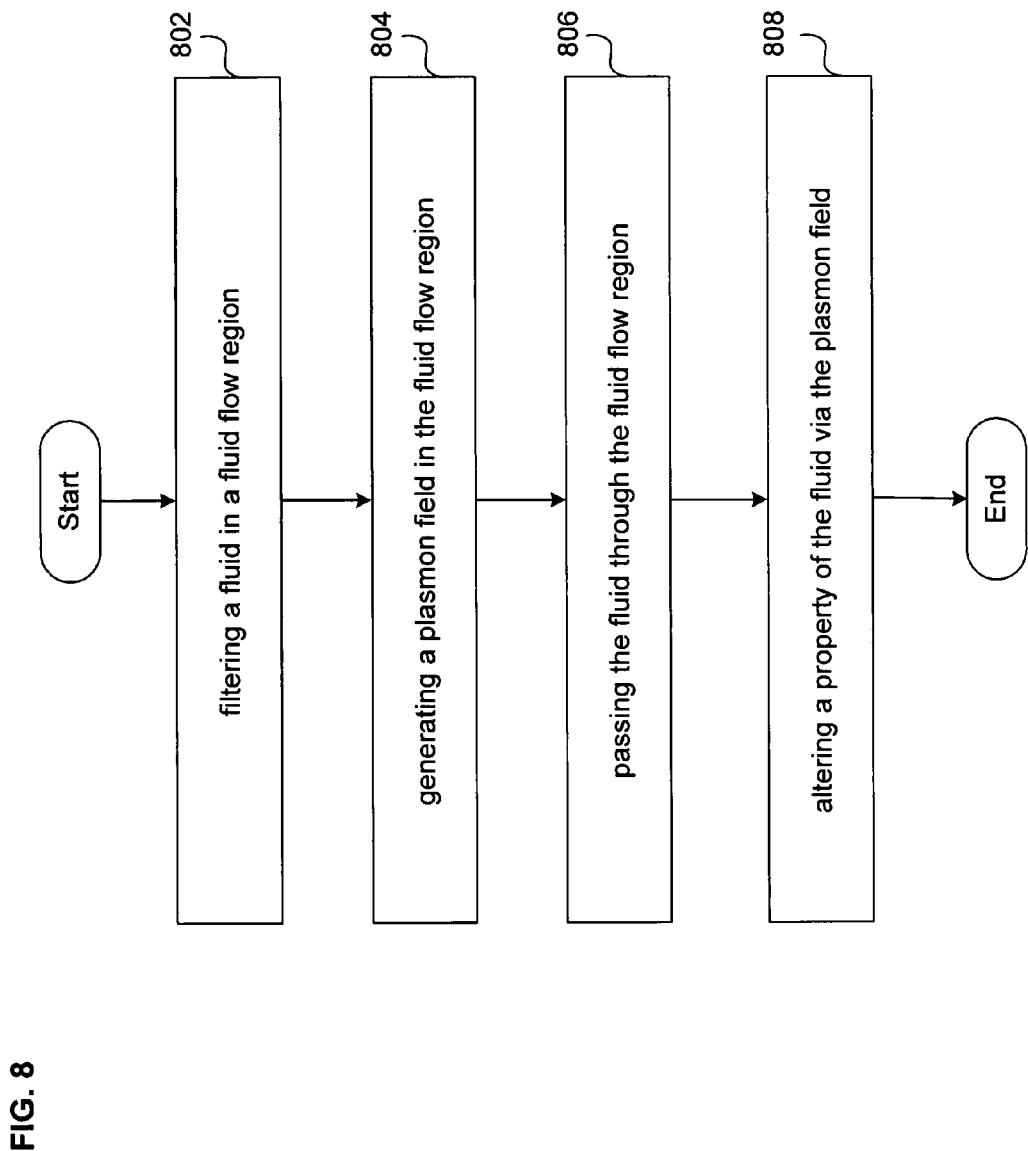
FIG. 8 is a flow chart depicting a method.
Figure 9:
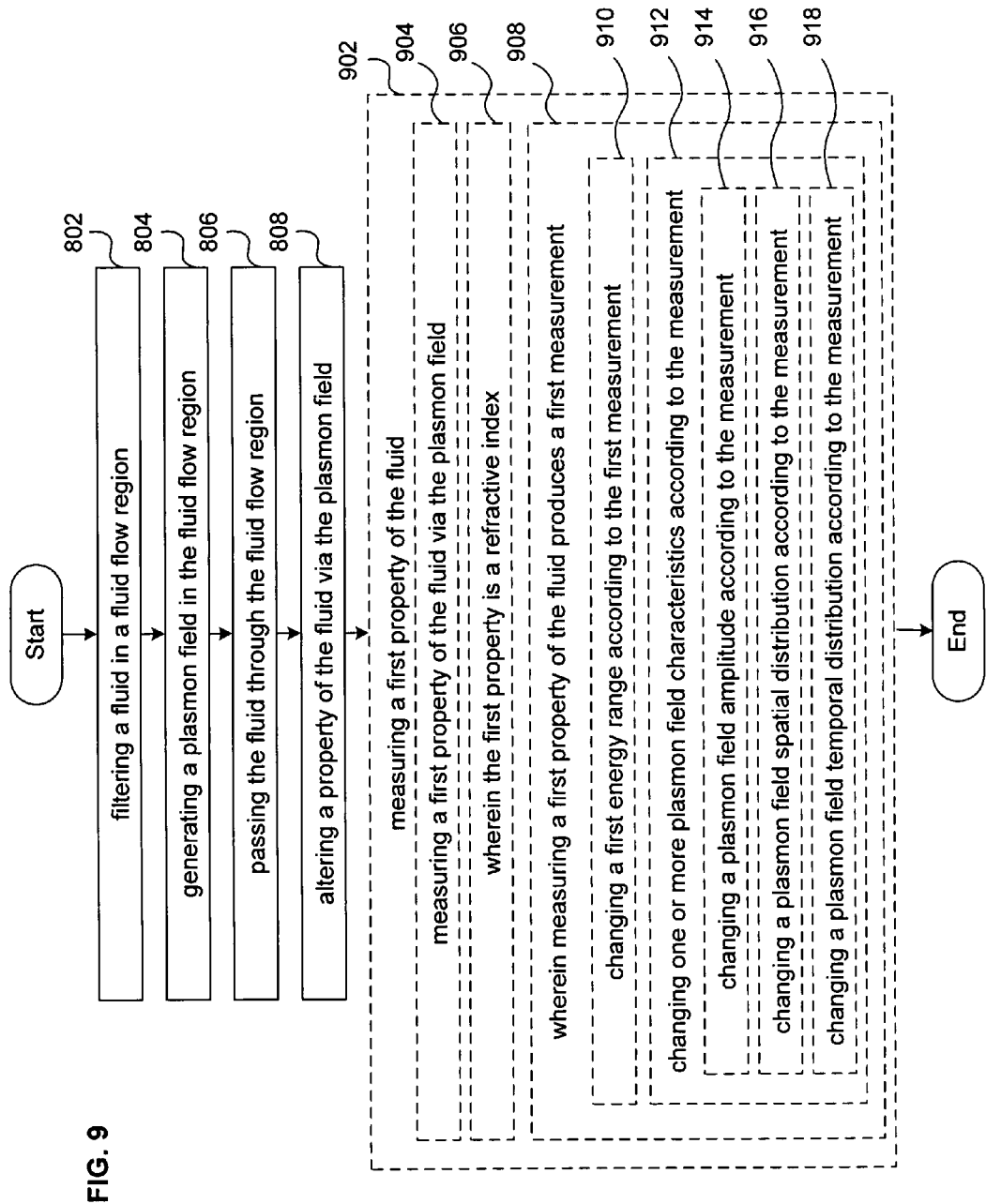
FIGS. 9-12 depict variants of the flow chart of FIG. 8.
Figure 10:
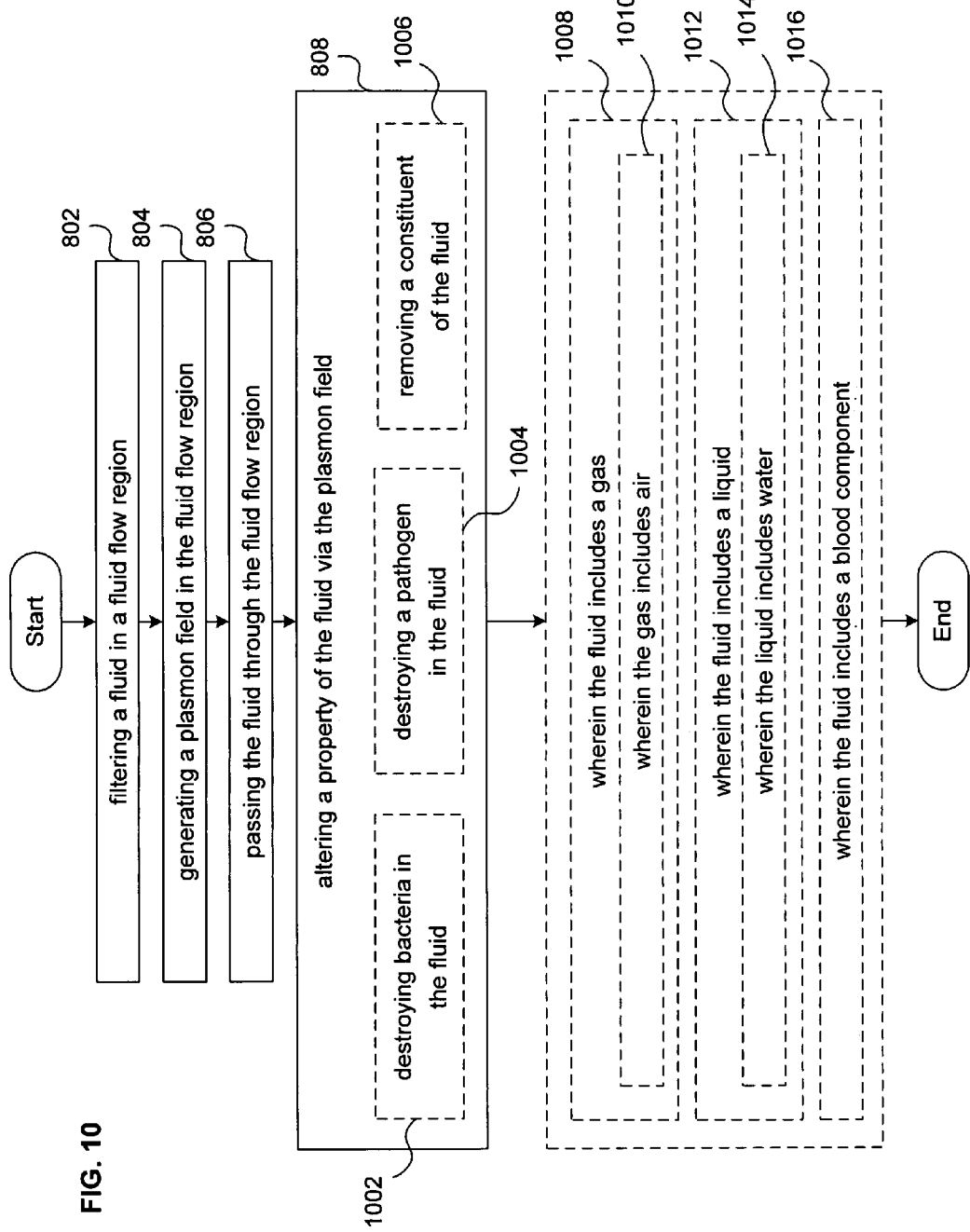
Figure 11:
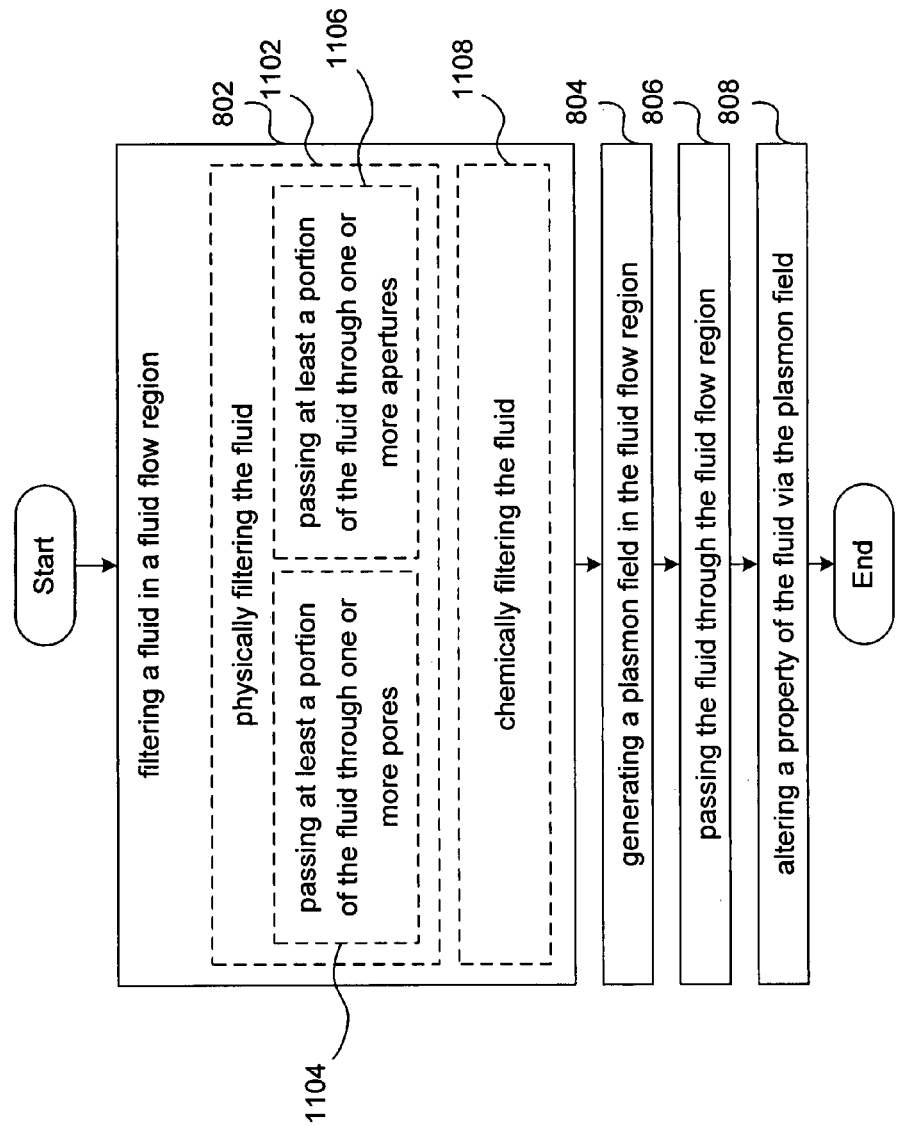
Figure 12:
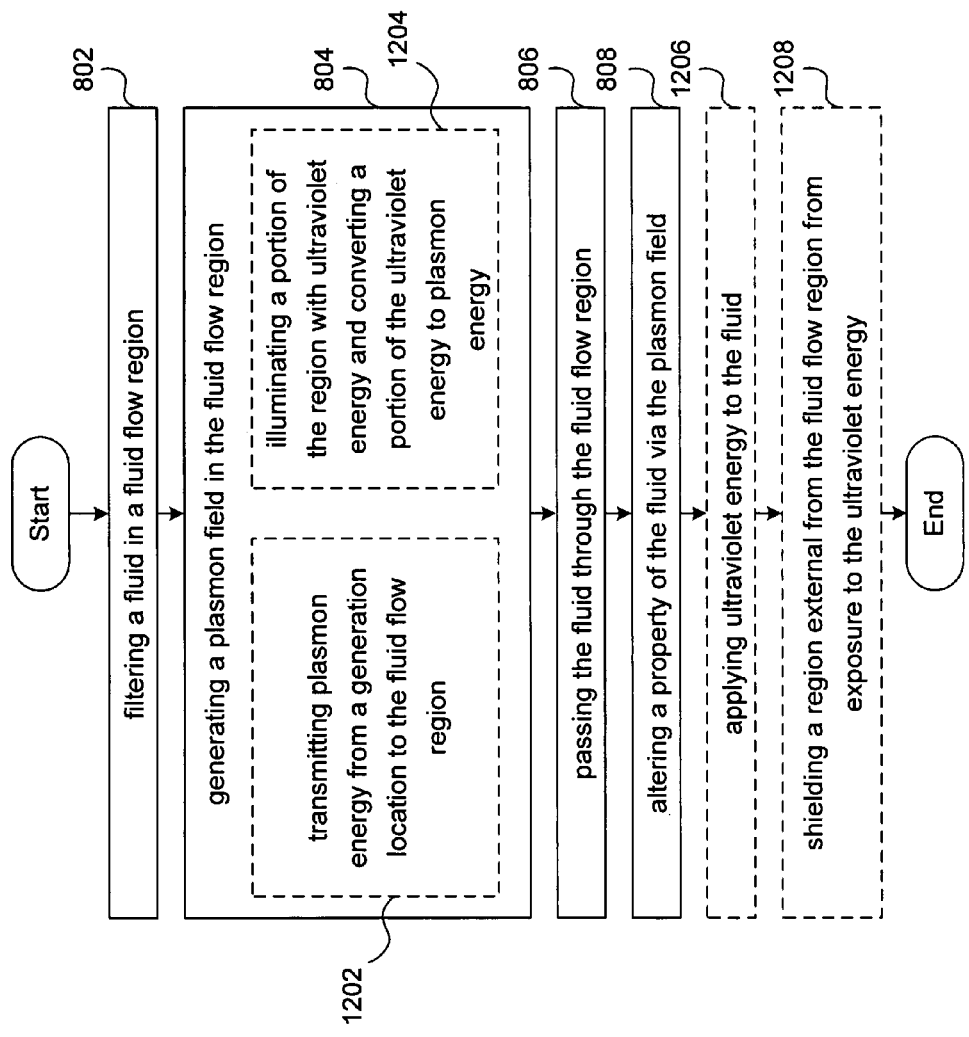

In one embodiment, a method depicted in the flow of FIG. 8 comprises: (802) filtering a fluid in a fluid flow region; (804) generating a plasmon field in the fluid flow region; (806) passing the fluid through the fluid flow region; and (808) altering a property of the fluid via the plasmon field.

The method may further comprise (902) measuring a first property of the fluid and (904) measuring a first property of the fluid via the plasmon field (for example, with a surface plasmon resonance sensor), (906) wherein the first property may be a refractive index and/or (908) wherein measuring a first property of the fluid produces a first measurement (for example, an index of refraction or reaction rate). The method may further comprise (910) changing a first energy range according to the first measurement (for example, the frequency range of the plasmons) and/or (912) changing one or more plasmon field characteristics according to the measurement, which may further include (914) changing a plasmon field amplitude according to the measurement, (916) changing a plasmon field spatial distribution according to the measurement, and/or (918) changing a plasmon field temporal distribution according to the measurement.

(808) Altering a property of the fluid via the plasmon field may include (1002) destroying bacteria in the fluid, (1004) destroying a pathogen in the fluid, and/or (1006) removing a constituent of the fluid. In one case (1008) the fluid may include a gas, where (1010) the gas may include air; in another case, (1012) the fluid may include a liquid, where (1014) the liquid may include water; and in yet another case, (1016) the fluid may include a blood component.

In one case (802) filtering a fluid in a fluid flow region may include (1102) physically filtering the fluid, where (1102) physically filtering the fluid may further include (1104) passing at least a portion of the fluid through one or more pores and/or (1106) passing at least a portion of the fluid through one or more apertures. (802) Filtering a fluid in a fluid flow region may include (1108) chemically filtering the fluid.

In one case (804) generating a plasmon field in the fluid flow region includes (1202) transmitting plasmon energy from a generation location to the fluid flow region and/or (1204) illuminating a portion of the region with ultraviolet energy and converting a portion of the ultraviolet energy to plasmon energy. The method may further comprise (1206) applying ultraviolet energy to the fluid and/or (1208) shielding a region external from the fluid flow region from exposure to the ultraviolet energy, via a UV absorber, reflector, or a different apparatus.

Figure 13:
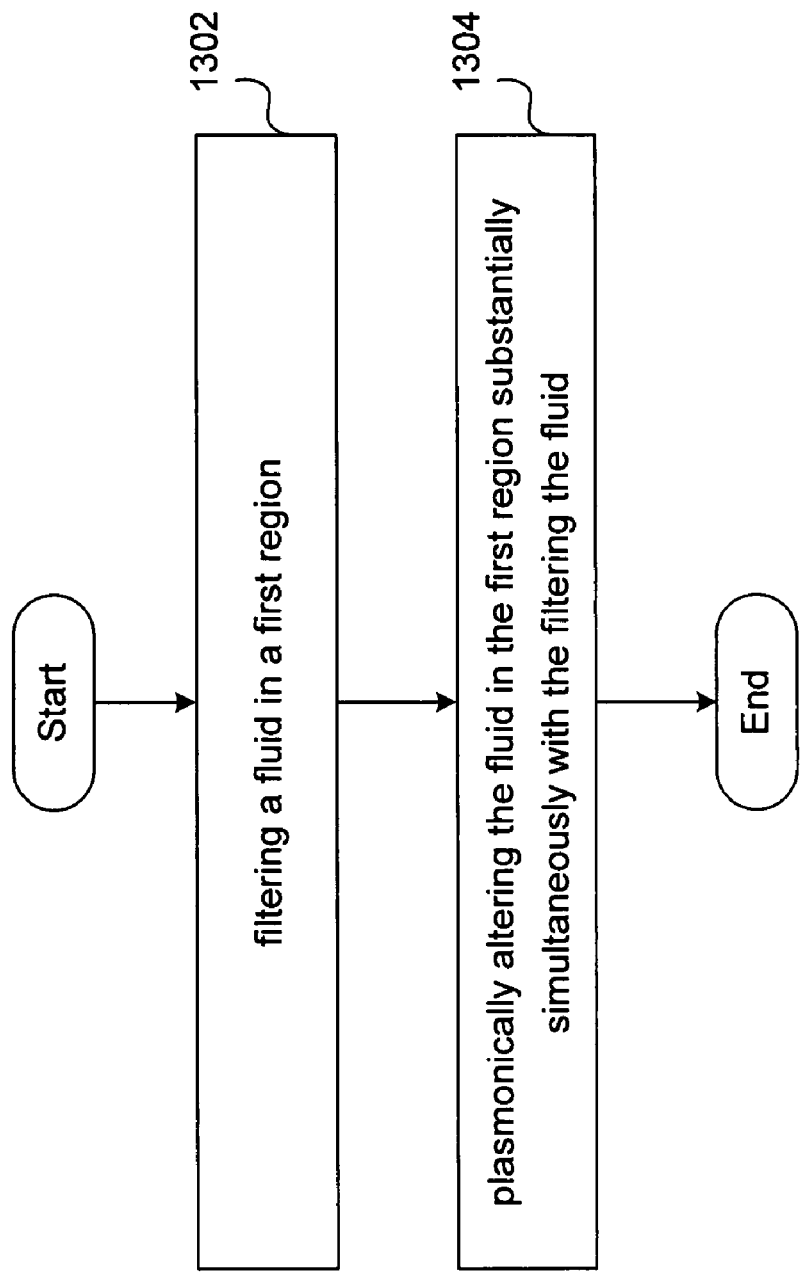
FIG. 13 is a flow chart depicting a method.

In another embodiment, a method depicted in the flow of FIG. 13 comprises: (1302) filtering a fluid in a first region; and (1304) plasmonically altering the fluid in the first region substantially sumultaneously with the filtering the fluid.

Figure 14:
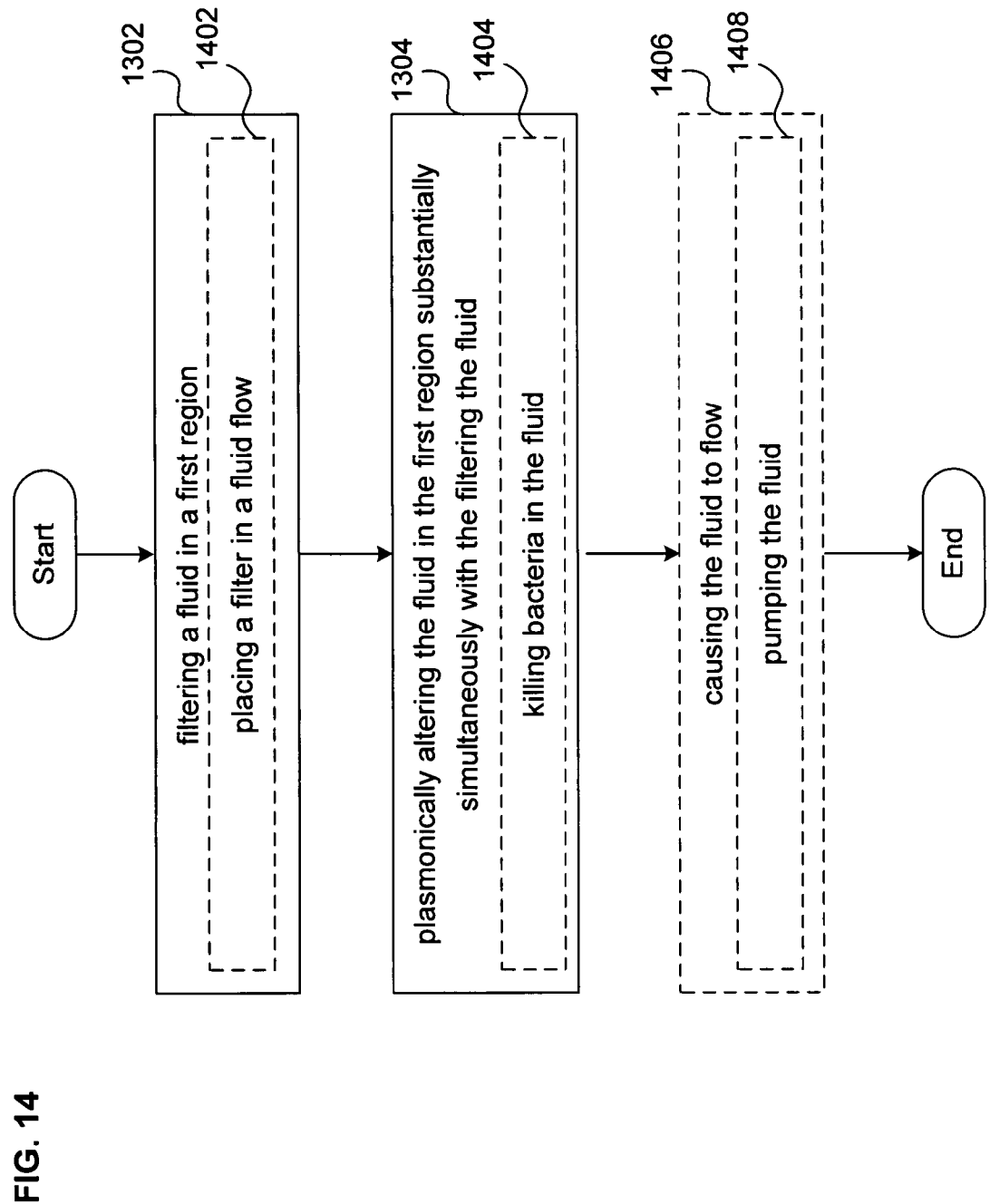
FIGS. 14-16 depict variants of the flow chart of FIG. 8.

As shown in FIG. 14, (1302) filtering a fluid in a first region may include (1402) placing a filter in a fluid flow, and (1304) plasmonically altering the fluid in the first region substantially sumultaneously with the filtering the fluid may include (1404) killing bacteria in the fluid. The method may further include (1406) causing the fluid to flow, which may further include (1408) pumping the fluid.

Figure 15:
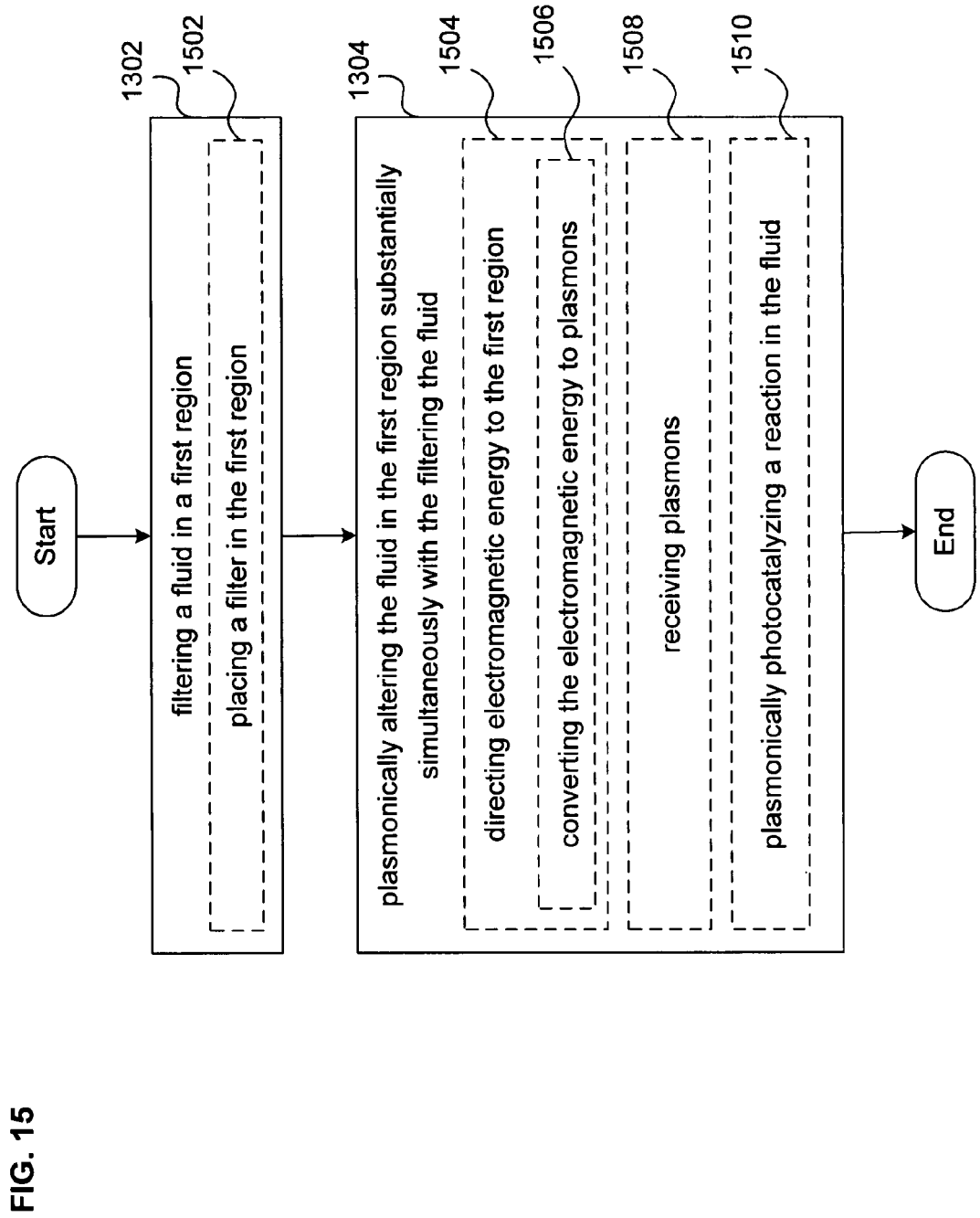

As shown in FIG. 15, (1302) filtering a fluid in a first region may include (1502) placing a filter in the first region, and (1304) plasmonically altering the fluid in the first region substantially sumultaneously with the filtering the fluid may include (1504) directing electromagnetic energy to the first region, which may further include (1506) converting the electromagnetic energy to plasmons. (1304) Plasmonically altering the fluid in the first region substantially sumultaneously with the filtering the fluid may further include (1508) receiving plasmons, and/or (1510) plasmonically photocatalyzing a reaction in the fluid.

Figure 16:
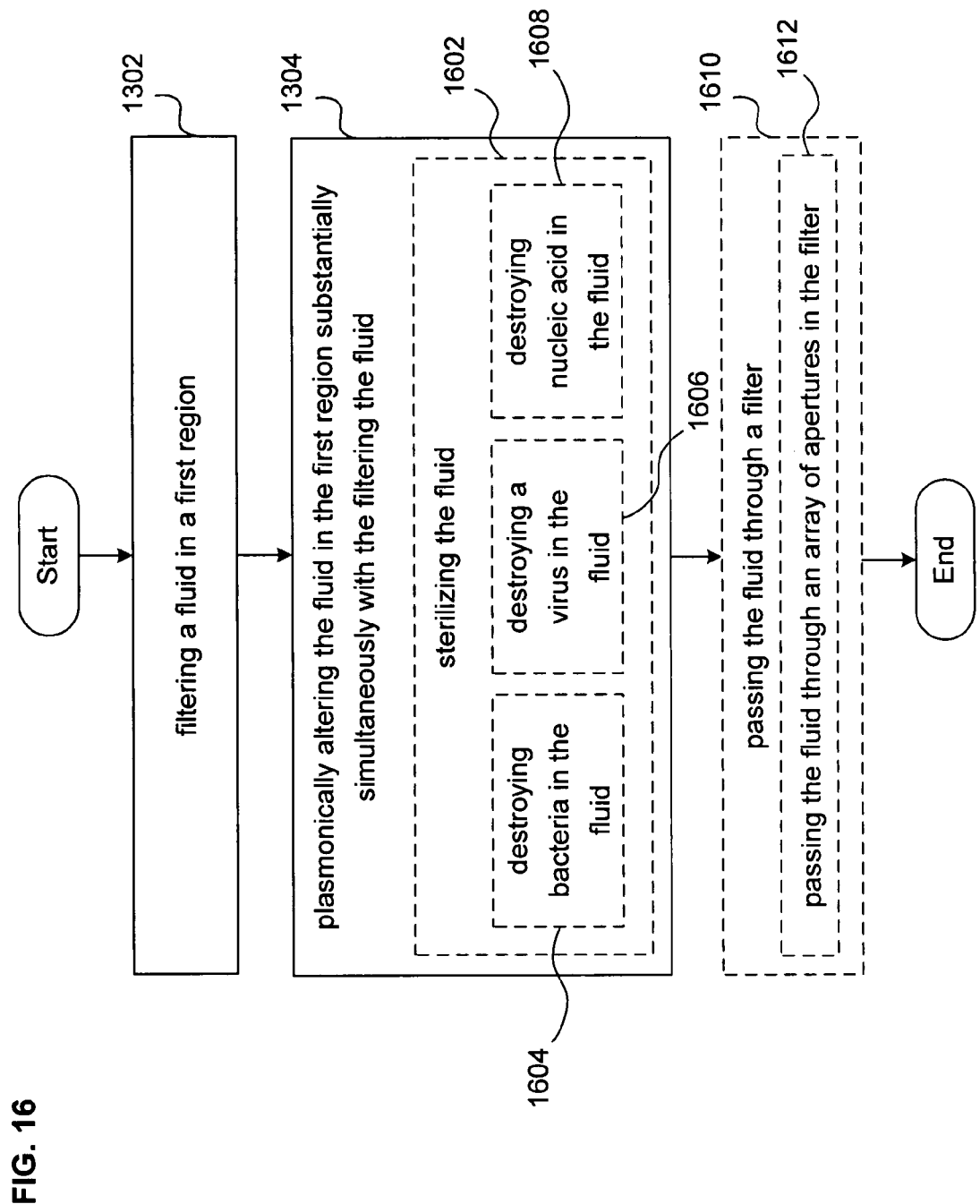

As shown in FIG. 16, (1304) plasmonically altering the fluid in the first region substantially sumultaneously with the filtering the fluid may include (1602) sterilizing the fluid, which may further include: (1604) destroying bacteria in the fluid, (1606) destroying a virus in the fluid, and/or (1608) destroying nucleic acid in the fluid. The method may further comprise (1610) passing the fluid through a filter, which may further comprise (1612) passing the fluid through an array of apertures in the filter.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

What is claimed is:

1. An apparatus comprising:
   a first element supportive of plasmon energy in a first energy range, the first element including a first plurality of openings;
   each of the openings in the first plurality of openings being configured to selectively pass a first portion of a first material;
   each of the openings in the first plurality of openings having a respective characteristic dimension selected to provide substantial overlap of the passed first portion of the first material and the plasmon energy in the first energy range proximate the opening; and
   wherein at least one of the openings in the first plurality of openings is operably connected to a MEMS to selectively pass the first portion of the first material.

2. A method comprising:
   filtering a fluid in a fluid flow region;
   generating a plasmon field in the fluid flow region, wherein generating a plasmon field in the fluid flow region further includes;
      illuminating a portion of the region with ultraviolet energy; and
      converting a portion of the ultraviolet energy to plasmon energy;
   passing the fluid through the fluid flow region; and
   altering a property of the fluid via the plasmon field.

3. The method of claim 2 wherein altering a property of the fluid includes destroying a pathogen in the fluid.

* * * * *

UNITED STATES PATENT AND TRADEMARK OFFICE
CERTIFICATE OF CORRECTION

| | | |
|---|---|---|
| PATENT NO. | : 7,972,557 B2 | Page 1 of 1 |
| APPLICATION NO. | : 11/897526 | |
| DATED | : July 5, 2011 | |
| INVENTOR(S) | : Roderick A. Hyde | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this
Eighteenth Day of October, 2011

David J. Kappos
*Director of the United States Patent and Trademark Office*